Jan. 5, 1926.
R. S. MORGAN
1,568,611
PUSH LEVER FOR OPERATING CLOSET TANK VALVES
Filed July 2, 1925
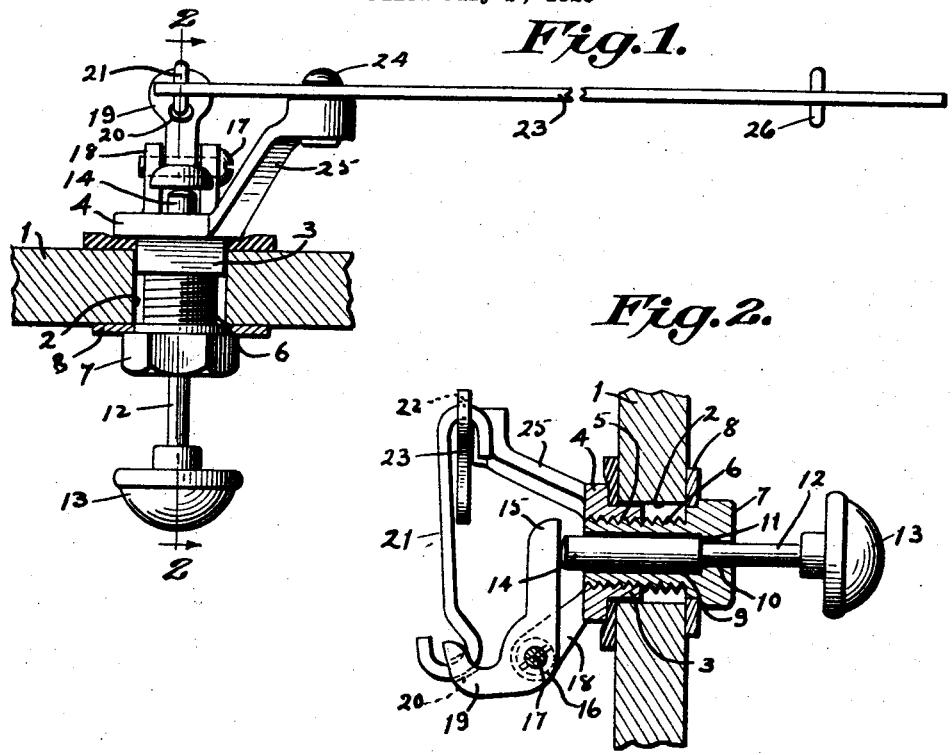
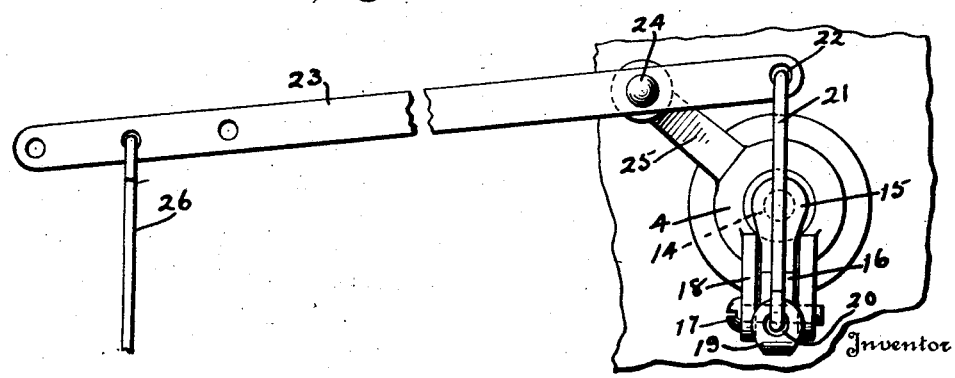
Inventor
Ralph S. Morgan.
By Louis C. Vanderlip.
Attorney Patented Jan. 5, 1926.

1,568,611

UNITED STATES PATENT OFFICE.

RALPH S. MORGAN, OF ELKHART, INDIANA, ASSIGNOR TO NORTHERN INDIANA BRASS COMPANY, OF ELKHART, INDIANA, A CORPORATION OF INDIANA.

PUSH LEVER FOR OPERATING CLOSET-TANK VALVES.

Application filed July 2, 1925. Serial No. 41,175.

*To all whom it may concern:*

Be it known that I, RALPH S. MORGAN, a citizen of the United States, residing in the city of Elkhart, county of Elkhart, and State of Indiana, have invented certain new and useful Improvements in Push Levers for Operating Closet-Tank Valves, of which the following is a specification.

This invention relates to mechanism for flushing tanks and has particular reference to the lever mechanism for operating the flush valve of a closet tank.

The principal object of the invention is to provide improved lever mechanism for operating the flush valve of a water closet tank in which improved push-pin mechanism is incorporated.

Other objects of the invention are mentioned and described herein.

The preferred embodiment of my invention is illustrated in the accompanying drawing in which Figure 1 is a plan view in cross-section through a closet tank wall illustrating the assembled form of the device; Fig. 2 is a section taken on line 2—2 of Fig. 1; and Fig. 3 is a view of the parts illustrated in Fig. 1 in elevation from the tank interior.

Similar numerals of reference indicate like parts throughout the several views on the drawing.

Referring to the details of the drawing the numeral 1 indicates a fragment of any type of water closet tank wall which may be provided with the polygonal aperture 2 which is engaged by the polygonal hub 3 of the bracket element, 4, the latter being adapted for arrangement within the tank.

The bracket element 4 is centrally apertured and interiorly screw threaded at 5, said threaded aperture being engaged by the exteriorly screw threaded shank 6 of the bearing nut 7 which is inserted into the opening 2 from the tank exterior, whereby the two elements may be rigidly screwed together and against the opposite sides of the tank wall, the polygonal hub 3 of said bracket preventing rotation of the latter. The outer end of the nut 7 may be polygonally formed to take a wrench for adjustment thereof, and a washer 8 may be interposed between said nut and the tank wall.

The bearing nut 7 and its shank is provided with a bore therethrough which assumes the form of a cylindrical bore 9 and a reduced cylindrical bore 10 in communication therewith, the latter of which may be substantially shorter than the former, the annular shoulder 11 being formed at the junction of the two bores. The numeral 12 indicates the push-pin of the device which is slidably arranged within the bores 9 and 10 at substantially right angles to the tank wall and extending to the tank interior, the outer end of which pin may carry a knob 13. The forward portion 14 of the push-pin which is arranged in bore 9 may be somewhat larger in diameter than the bore 10 and one end thereof normally engages the annular shoulder 11 which limits the outward movement thereof, and the point of section 14 of said pin may extend through the bore 11 into the tank interior and into engagement with the upright arm 15 of the bell-crank lever 16 for rocking the latter, as hereinafter described. The bell-crank 16 is pivotally carried upon a horizontally disposed pivot pin 17 mounted in the fork 18 integral with the bracket element 4, the pin 17 being formed in any suitable manner as a screw or split cotter pin. The bell-crank 16 includes also the forwardly projecting lever arm 19, the point whereof is suitably apertured at 20 to take the lower hook of the link 21 which extends vertically therefrom, the upper end of said link having a hook which engages in the aperture 22 in the shorter end of the valve lever 23, the latter being pivotally carried intermediate its extremities at 24 upon a bracket arm 25 which may be integral with bracket 4. The arm 25 of bracket element 4 extends angularly relative to the plane of movement of the bell-crank lever 16 and is preferably cast integral with said bracket element. The lever 23 is pivoted at 24 intermediate its extremities, as shown, the link 21 being connected therewith at one end and the usual upright link 26 at the other end thereof, the latter link being adapted to lift the flush-valve—not shown—as is well known in the art.

In the operation of the invention, pressure upon the knob 13 of the push-pin 12 causes the bell-crank lever 16 to tilt forward, whereby the valve lever 23 is rocked and the flush-valve unseated thereby. When the tank is drained and pressure upon the knob 13 is relieved the weight of lever 23 automatically restores the various parts to their original, or retracted, operative position, including the push-pin which is retracted until the shoulder 11 stops it and prevents further outward movement thereof.

I claim:—

1. In a device for operating a flush-tank valve, the combination of a bracket element non-rotatably mounted in an opening in a flush-tank wall; a bell-crank lever carried by said bracket; a pivotally mounted flush-valve lever carried within the tank; a link connecting said valve lever with one arm of the bell-crank; and a push-pin extending through said bracket element into operative relation with said bell-crank, whereby sliding movement of said push-pin causes rocking movement of said bell-crank and flush-valve lever.

2. In a device for operating a flush-tank valve, the combination of a bracket element non-rotatably mounted in an opening in a flush-tank wall; a bell-crank lever carried by said bracket; a pivotally mounted flush-valve lever carried within the tank; a link connecting said valve lever with one arm of the bell-crank; a push-pin extending through said bracket element into operative relation with said bell-crank, whereby sliding movement of said push-pin causes rocking movement of said bell-crank and flush-valve lever; and stop means to limit the outward movement of said push-pin.

3. In a device for operating a flush-tank valve, the combination of a bracket element non-rotatably mounted in an opening in a flush-tank wall; a bell-crank lever carried by said bracket; a pivotally mounted flush-valve lever carried by said bracket element; a link connecting said valve lever with one arm of said bell-crank; a push-pin extending through said bracket element into operative relation with said bell-crank, whereby sliding movement of said push-pin causes rocking movement of said bell-crank and flush-valve lever; and stop means to limit the outward movement of said push-pin, the weight of said flush-valve lever normally retracting said push-pin into engagement with said stop means.

4. In a device for operating a flush-tank valve, the combination of a bracket element non-rotatably mounted in an opening in a flush-tank wall; a bell-crank lever pivotally mounted upon a bearing element carried by said bracket; a bracket arm projecting from said bracket element; a flush-valve lever pivotally mounted upon said bracket arm; a link connecting said valve lever with one arm of said bell-crank; and a push-pin extending through said bracket element into operative relation with said bell-crank, whereby sliding movement of said push-pin causes rocking movement of said bell-crank and flush-valve lever.

In witness whereof I have affixed my signature this 30th day of June, 1925.

RALPH S. MORGAN.